United States Patent
Cohen et al.

(10) Patent No.: US 11,650,731 B2
(45) Date of Patent: May 16, 2023

(54) EMBEDDED DYNAMIC USER INTERFACE ITEM SEGMENTS

(71) Applicant: ServiceNow, Inc., Santa Clara, CA (US)

(72) Inventors: Maor Cohen, Tel Aviv (IL); Alexander Fedayev, Netanya (IL); Eliran Zvi, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/369,759

(22) Filed: Jul. 7, 2021

(65) Prior Publication Data

US 2023/0011522 A1 Jan. 12, 2023

(51) Int. Cl.
| | |
|---|---|
| G06F 3/0481 | (2022.01) |
| G06F 3/04842 | (2022.01) |
| G06F 3/0485 | (2022.01) |
| G06F 16/904 | (2019.01) |

(52) U.S. Cl.
CPC .......... *G06F 3/0485* (2013.01); *G06F 3/0481* (2013.01); *G06F 3/04842* (2013.01); *G06F 16/904* (2019.01)

(58) Field of Classification Search
CPC .. G06F 3/0485; G06F 3/0481; G06F 3/04842; G06F 16/904
See application file for complete search history.

(56) References Cited

U.S. PATENT DOCUMENTS

| | | | |
|---|---|---|---|
| 9,569,419 B1* | 2/2017 | Rice | G06Q 30/0631 |
| 2015/0153910 A1* | 6/2015 | Wheeler | G06F 3/0482 |
| | | | 715/837 |
| 2019/0268354 A1* | 8/2019 | Zettel, II | H04L 63/1441 |
| 2020/0074001 A1* | 3/2020 | Lloyd | G06F 16/9535 |

OTHER PUBLICATIONS

Anneliese Andrews et al., From Incident Reports to Improvement Recommendations: Analyzing IT Help Desk Data, Apr. 1, 2014, Conference Publishing Services, pp. 94;-103 (Year: 2014).*
Marco Winckler et al., Identifying User Experience Dimensions for Mobile Incident Reporting in Urban Contexts, Jun. 1, 2013, IEEE Transactions on Professional Communication, vol. 56, No. 2, pp. 97-119 (Year: 2013).*

* cited by examiner

*Primary Examiner* — Tam T Tran
(74) *Attorney, Agent, or Firm* — Van Pelt, Yi & James LLP

(57) ABSTRACT

An indication to view a selected record of a workflow is received. A user interface view for the selected record is provided that includes at least one embedded segment section with scrollable items representing other related records associated with the selected record. The user interface view for the selected record was configured to provide the at least one embedded segment section due to a configuration that includes a selection among automatically determined options of related record groups associated with the selected record.

20 Claims, 9 Drawing Sheets

//‌

EMBEDDED DYNAMIC USER INTERFACE ITEM SEGMENTS

BACKGROUND OF THE INVENTION

Cloud-based services allow customers to store, access, and manage small to large volumes of customer data that can be accessed remotely from a variety of clients. The stored customer data can be a diverse assortment of data including structured data with interrelationships. For example, stored customer data can include customer submitted information technology incident reports. Each submitted incident report can include related stored customer data such as related incidents, impacted software and/or hardware, and the parts required to resolve the incident. The ability to access and manage the customer data can be provided by a variety of cloud-based services. These services can allow customers to interact with the customer data, for example, by viewing and modifying the data.

BRIEF DESCRIPTION OF THE DRAWINGS

Various embodiments of the invention are disclosed in the following detailed description and the accompanying drawings.

DETAILED DESCRIPTION

Figure 1:
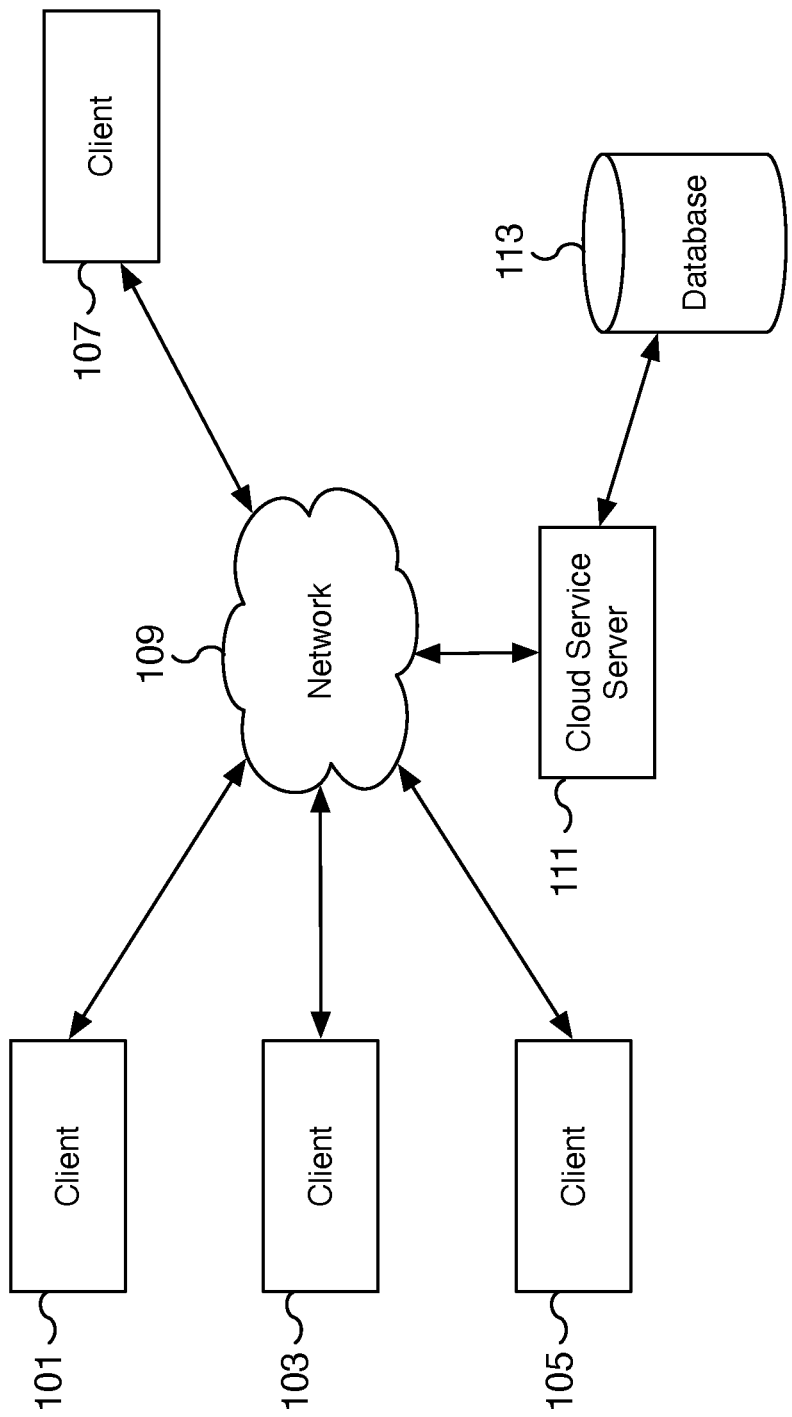
FIG. 1 is a block diagram illustrating an example of a network environment for an application utilizing a dynamic user interface item segment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embedded user interface item segments utilizing dynamic relationship-based content is disclosed. Using the disclosed techniques, a user interface for a selected item can be created that includes one or more embedded dynamic item segments. The contents of a dynamic item segment can be based on existing relationships with the current selected and displayed item. For example, a user interface screen for a selected item corresponds to an item record in a configuration management database (CMDB). The user interface screen can include a header section displaying properties of the selected item record along with one or more static and one or more dynamic item segments. With respect to a dynamic item segment, the contents can include a display of dynamically determined items that utilizes a relationship with the current item. For example, a dynamic item segment can be populated with item records based on one or more automatically determined database relationships with the selected item and/or properties of the selected item. As another example, the dynamic item segment can be populated with item records based on a query that utilizes one or more automatically determined database relationships with the selected item. In various embodiments, the dynamically determined list of items for a dynamic item segment is displayed as either a horizontal or vertical stack of scrollable items. For example, each dynamic item can be represented using a modular and interactive user interface element that responds to scrolling events to reveal more or less of the item and/or to reveal or hide more or fewer items.

In various embodiments, the disclosed user interface techniques and in particular the techniques related to embedded dynamic item segments allow for the rapid and easy creation of a user interface including mobile user interfaces that allows users to easily and quickly view and navigate complex data sets with interrelationships. For example, a touch-based mobile device user interface can present a list of records such as a list of information technology incidents managed via a cloud service. The user can select one of the records pertaining to a specific incident. The selected incident user interface view can provide a user interface view for the selected record, displaying high-level item information as well as the ability to display additional related information such as detailed incident information and related dynamic incident information. As an example, the selected incident user interface view can include an incident header view that displays high-level incident information such as status (e.g., new, in progress, closed, etc.), an incident identifier, an impact score, a priority rating of the incident, and a caller identifier. As part of the selected incident user interface view, user interface segments can also be embedded that allow the user to view related information of the selected record. For example, possible embedded segments for a selected information technology incident may include a details segment, an activity segment, and a related lists segment, among others. Selecting the details segment can display additional details of the selected incident, such as a related address and/or location, a brief description of the incident, and assignment information in an embedded segment. The displayed detail data in the details segment can include additional data of the incident record that may not be included in the header view. Similarly, selecting the activity segment can display activities information performed for the incident, which may also be stored as data included in the selected incident record.

Using the disclosed techniques, in some embodiments, the selected incident user interface view can include one or more embedded dynamic item segments. Unlike the details and activity segments, which may be limited to include only data of the selected incident record, an embedded dynamic item segment can display data from a dynamically updated set of items that are related to the selected incident but not included in the database record of the selected incident. For example, a dynamic item segment can be configured with a query for all database records with a particular relationship with the selected incident, such as all other incidents at the same address, belonging to the same user, and/or impacting the equipment, etc. As another example, a dynamic item segment can be configured with a query for all database records with an active status. The data for the displayed segment items can exist as separate database records different from the selected incident. As the records in the database are updated, for example, by users of the cloud service, the dynamically displayed items are also updated in the embedded dynamic item segment of the user interface. In various embodiments, the relationship used for the configured query of the dynamic item segment can be selected from a list of automatically determined relationships. For example, by tracking database relationships, a user interface configuration tool automatically presents all valid relationships from which a query can be constructed to generate a list of dynamic items for an embedded dynamic item segment.

In some embodiments, dynamic item segments allow a user to interact with the displayed items as scrollable items. For example, each included item of a dynamic item segment can be displayed as a user interface card. In some embodiments, the cards are arranged horizontally, and a user can interact with the cards using horizontal scrolling user events such as by scrolling left/right to reveal different cards. Similarly, in some embodiments, the cards are arranged vertically, and a user can interact with the cards using vertical scrolling user events such as by scrolling up/down to reveal different cards. In various embodiments, an embedded dynamic item segment is configurable and allows a user interface designer (potentially with little to no user interface programming knowledge) to configure the display properties of the relevant segment items. In some embodiments, the dynamic item segment also includes an additional view, such as a "show all" view, that collectively displays the items of the dynamic item segment in a separate view. The additional view allows the user of the user interface to break out of the view of the selected record and display only the items of the dynamic item segment, for example, as a scrollable list. Although the additional view does not display the selected record, it importantly maintains the context of the selected record and only presents items related to the selected record. In some embodiments, a user can further add or create new items that belong to a dynamic item segment, for example, from a drop-down menu associated with a dynamic item segment from within a user interface view. When a user requests a new item be created within the context of a dynamic item segment, a new database record is automatically created with proper context of the selected record. For example, the database relationships that are required for the new item to exist in the dynamic item segment are automatically created for the new item record.

In some embodiments, certain user interface portions of a dynamic item segment are at least partially automatically generated. For example, a user interface designer can select, using a user interface configuration tool, the tables, columns of tables, and related data to include and display in a dynamic item segment when a record is selected. Moreover, in some embodiments, the relationships between a selected record and items of an embedded dynamic item segment are automatically determined and presented to the user interface designer. The user interface designer can utilize the automatically identified relationships and properties of the selected record to construct a customized query for selecting the items to include in the dynamic item segment. For example, a dynamic item segment for "nearby related incidents" can display a filtered set of related incidents based on a location property of the selected record. Using a location property specific to the selected record and functionality to determine distance, a user interface designer can configure a "nearby related incidents" dynamic item segment to display only related incidents within a configured distance of the selected record.

In some embodiments, an indication to view a selected record of a workflow is received. For example, a mobile user interacts with a mobile user interface to view a specific item record in a configuration management database (CMDB), such as a record corresponding to a specific incident report that is part of an information technology incident reporting workflow to identify and resolve information technology incidents. In some embodiments, a user interface view is provided for the selected record, wherein the user interface view includes at least one embedded segment section including scrollable items representing other related records associated with the selected record. For example, the mobile user interface displays the selected incident record as well as an embedded dynamic section that displays related records such as nearly related incidents. The included embedded dynamic section can display the related records as scrollable items such as a set of scrollable user interface cards. In some embodiments, the user interface view for the selected record was configured to provide the embedded segment section due to a configuration including a selection among automatically determined options of related record groups associated with the selected record. For example, the configuration of the user interface view for the selected record includes an automatically populated selection dialog that presents the user interface designer with automatically determined options of related record groups associated with the selected record. For example, the related record groups for an incident report can be records related to the selected incident based on location, assignment group, description, priority, or another incident record property or relationship.

FIG. 1 is a block diagram illustrating an example of a network environment for an application utilizing a dynamic user interface item segment. In the example, clients 101, 103, 105, and 107 and cloud service server 111 are communicatively connected via network 109. Network 109 can be a public or private network. In some embodiments, network 109 is a public network such as the Internet. In some embodiments, clients 101, 103, 105, and 107 are on a private local network separate from cloud service server 111. In the example shown, cloud service server 111 is communicatively connected to database 113. Cloud service server 111 and database 113 may be on the same network and/or hosted in the same datacenter or connected via another topology than the one shown. In various embodiments, cloud service server 111 utilizing database 113 hosts cloud services such as a web application for configuring and/or deploying an application such as an end-user mobile application. Cloud service server 111 utilizing database 113 can also host customer data that is dynamically served to the deployed application, which can view the relevant data via a user interface that includes one or more dynamic item segments. In some embodiments, cloud service server 111 hosts configuration management database (CMDB) services. Additional services provided by cloud service server 111 can include resource discovery, resource management, event management, cloud management, maintenance, and compliance services, among others. In the various scenarios, database 113 can be utilized to store data related to the cloud-hosted services offered by cloud service server 111.

In some embodiments, clients 101, 103, 105, and 107 are example client systems used to connect to cloud services offered by cloud service server 111. Clients 101, 103, 105, and 107 may have different software/hardware configurations and can include laptops, desktop computers, mobile devices, tablets, kiosks, smart televisions, or other appropriate computing devices. In some embodiments, the clients are used to configure an application, such as an end-user mobile application by at least in part configuring the user interface for displaying data hosted by a cloud service via one or more dynamic item segments. The application can be automatically generated and deployed to clients, such as clients 101, 103, 105, and 107. Once running on clients, the generated application can access cloud service server 111 to dynamically retrieve and display the data from database 113 via one or more dynamic item segments such as an embedded dynamic item segment of a mobile user interface.

In some embodiments, database 113 is utilized by cloud service server 111 to store information relevant to clients 101, 103, 105, and 107, such as customer data that is dynamically retrieved for viewing in a mobile application with embedded dynamic item segments. The data can include data organized by relationships and stored across multiple related tables. As one example, the application can be used to track and view an incident reporting and resolution workflow. The stored data can include incident information where incidents include relationship properties such as status (e.g., new, in progress, closed, etc.), priority, impact, location, description, and assignment group, etc. In some embodiments, database 113 is a CMDB database. For example, database 113 can be used to store resource discovery information as part of a CMDB service for managing client resources. The CMDB data can be organized by relationships and displayed/managed via an application that utilizes embedded dynamic item segments. Although database 113 is shown connected to cloud service server 111, database 113 may be located in a variety of network locations as appropriate. For example, database 113 may be located external to a local network that includes clients 101, 103, 105, and 107. In some embodiments, database 113 is not directly connected to cloud service server 111 but only communicatively connected to cloud service server 111. In some embodiments, database 113 is a cloud-based database server and may be part of and/or collocated with cloud service server 111.

Although single instances of some components have been shown to simplify the diagram of FIG. 1, additional instances of any of the components shown in FIG. 1 may also exist. For example, cloud service server 111 may include one or more different servers and/or multiple distributed components. Similarly, database 113 may include one or more database servers and may not be directly connected to cloud service server 111. For example, database 113 and its components may be replicated and/or distributed across multiple servers, components, and/or locations. In some embodiments, components not shown in FIG. 1 may also exist.

Figure 2:
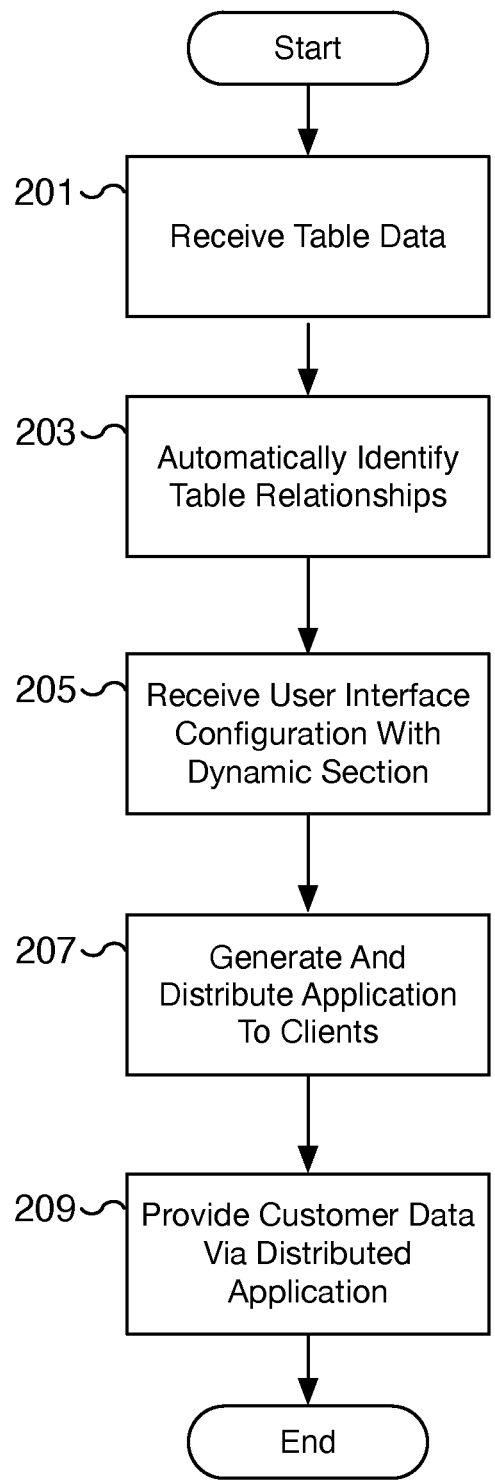
FIG. 2 is a flow chart illustrating an embodiment of a process for configuring a graphical user interface application utilizing a dynamic user interface item segment.

FIG. 2 is a flow chart illustrating an embodiment of a process for configuring a graphical user interface application utilizing a dynamic user interface item segment. Using the process of FIG. 2, a graphical user interface application for viewing customer data, such as customer data managed by a cloud service, can be configured and distributed to users. The application can be generated and deployed to target client devices such as mobile phones, laptops, and desktops, among others. The configured application is a graphical user interface application that can dynamically retrieve and display data using one or more dynamic user interface item segments. The retrieved data can be stored in one or more databases across multiple related tables. In some embodiments, the process of FIG. 2 is performed by a cloud service server such as cloud service server 111 of FIG. 1. For example, the process of FIG. 2 can be performed via clients such as clients 101, 103, 105, and 107 of FIG. 1 by accessing a cloud-based service hosted by a cloud service server such as cloud service server 111 of FIG. 1. In some embodiments, the data is stored in a database such as database 113 of FIG. 1.

At 201, table data is received. For example, customer data is received and stored in a data store such as in one or more database tables. The received table data can describe relationships between different records. For example, an incident record for a customer incident can reference impacted hardware and/or software assets, assignment groups responsible for resolving the incident, and related incidents, among other related table information. In various embodiments, the table data can be accumulated over time from various sources such as a cloud service administrator/operator, a cloud service user, and/or automated asset scanners, among other sources. In some embodiments, the table data corresponds to data records stored in a configuration management database (CMDB).

At 203, table relationships are automatically identified. For example, when table data is updated, relationships between database records can be automatically identified. In some embodiments, the relationships are identified when new tables are created. For example, the creation and/or use of keys, such as primary and foreign keys, can trigger the identification of table relationships. In some embodiments, for each database table, a list of active table relationships is maintained. As new relationships are created or removed, the list of active table relationships is updated.

At 205, a user interface configuration with a dynamic section is received. For example, the configuration for the creation of a user interface with an embedded dynamic item segment is received. The configuration parameters can include the customer data to retrieve from a data store for display in the user interface as well as how to display the retrieved data and how to respond to user interactions. In some embodiments, the user interface is configured to include multiple sections such as a header section and one or more static and/or dynamic sections. In some embodiments, a dynamic section can correspond to a dynamic item segment and the configuration for the dynamic item segment describes what items to include for display in the dynamic section. In various embodiments, a dynamic item segment configuration includes a configured query that references one or more properties of a selected item record. For example, a location field of a selected incident item can be utilized for creating a dynamic item segment query to capture all related incidents with a configured distance from the location of a selected item record. In some embodiments, the relationships and properties available for use in the configured query are determined automatically and are provided to a user interface designer via a user interface configuration tool. For example, the relationships automatically identified and tracked in 203 are used to provide a list of available relationships that can be used for configuring a dynamic item segment.

At 207, an application is generated and distributed to clients. For example, a mobile application that allows end-users to access the customer data identified from the table data received at 201 is compiled and built using the configured user interface received at 205. In some embodiments, the application is at least in part automatically generated using a configuration created via a user interface design tool. The created application can include one or more dynamically updated sections such as one or more configured dynamic item segments. Once generated, the application is distributed to clients. For example, the application is deployed to clients for accessing and viewing the at least a portion of the table data received at 201. In some embodiments, the clients are mobile phones and the generated application is a mobile application for an end user that includes a graphical user interface for viewing customer data. In some embodiments, the application is distributed to clients such as clients 101, 103, 105, and 107 of FIG. 1.

At 209, the customer data is provided via the distributed application. For example, users can access and view relevant customer data using the application generated and distributed at 207. As the customer data changes, for example, as records are added, deleted, and/or modified, the items displayed in dynamic item segments of the application user interface are correspondingly updated. In various embodiments, the item records to include in a dynamic item segment are dynamically retrieved from the data store storing the table data received at 201. For example, a user interface view can show information for an open incident selected by the user. The user interface view can further include an embedded dynamic item segment for open incidents related to the selected incident. As related incidents are closed, the newly closed incidents are no longer included and displayed in the dynamic item segment.

Figure 3:
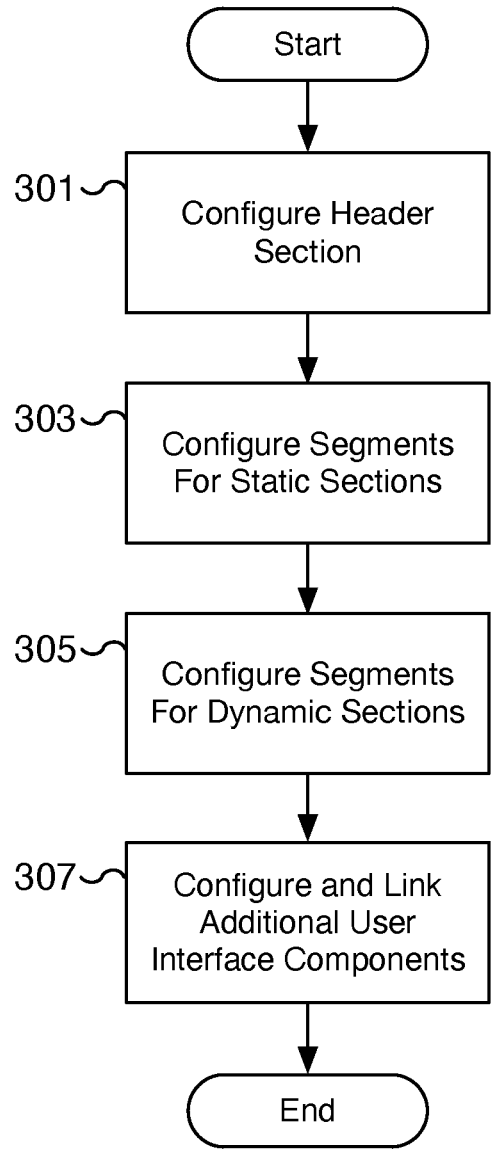
FIG. 3 is a flow chart illustrating an embodiment of a process for configuring a graphical user interface of an application that includes a dynamic user interface item segment.

FIG. 3 is a flow chart illustrating an embodiment of a process for configuring a graphical user interface of an application that includes a dynamic user interface item segment. Using the process of FIG. 3, an application user interface view is configured by configuring different sections of the user interface including a header section, static sections, and dynamic sections. In various embodiments, once the user interface is configured, the application can be automatically generated and deployed to target client devices such as mobile phones, laptops, and desktops, among others. The application can be utilized by clients to retrieve data from one or more databases across multiple related tables and to display a selected item record along with dynamically determined item records related to the selected item record. In some embodiments, the process of FIG. 3 is performed at 205 of FIG. 2. In some embodiments, the process of FIG. 3 is performed via clients such as clients 101, 103, 105, and 107 of FIG. 1 by accessing a cloud-based service hosted by a cloud service server such as cloud service server 111 of FIG. 1. In some embodiments, the data is stored in a database such as database 113 of FIG. 1.

At 301, a header section is configured. For example, a header section can be configured to retrieve and display information of a selected item record. The displayed information can include the most relevant and/or high-level information of the selected item record. For example, an incidents header section can include information such as status (e.g., new, in progress, closed, etc.), an incident identifier, an impact score, a priority rating of the incident, and a caller identifier.

At 303, segments for static sections are configured. For example, static sections can include embedded views for displaying static segments in the user interface view of a selected item record. The static segments can include additional information, such as additional detailed information of the selected item record, that does not require performing a dynamic item selection based on the selected item record. In various embodiments, the static segments can include information stored with the selected item record and do not rely on performing a dynamic query to retrieve additional related item records.

At 305, segments for dynamic sections are configured. For example, one or more dynamic item segments are configured for embedding in the user interface view of a selected item record. A configured dynamic item segment can specify a query used to dynamically determine the items to include in the dynamic segment. For example, an embedded dynamic segment can be used to display related open incidents. The segment is updated when new incidents are created and existing incidents are closed (i.e., no longer open).

At 307, additional user interface components are configured and linked. In some embodiments, a user interface view with static and dynamic sections includes additional user interface elements for accessing additional functionality. At 307, the additional user interface components can be configured. For example, one or more additional user interface components, such as a screen footer or menu can be configured and included in a screen. In various embodiments, the data sources and associated data source queries for the additional user interface components are specified and linked to the corresponding additional user interface components.

Figure 4:
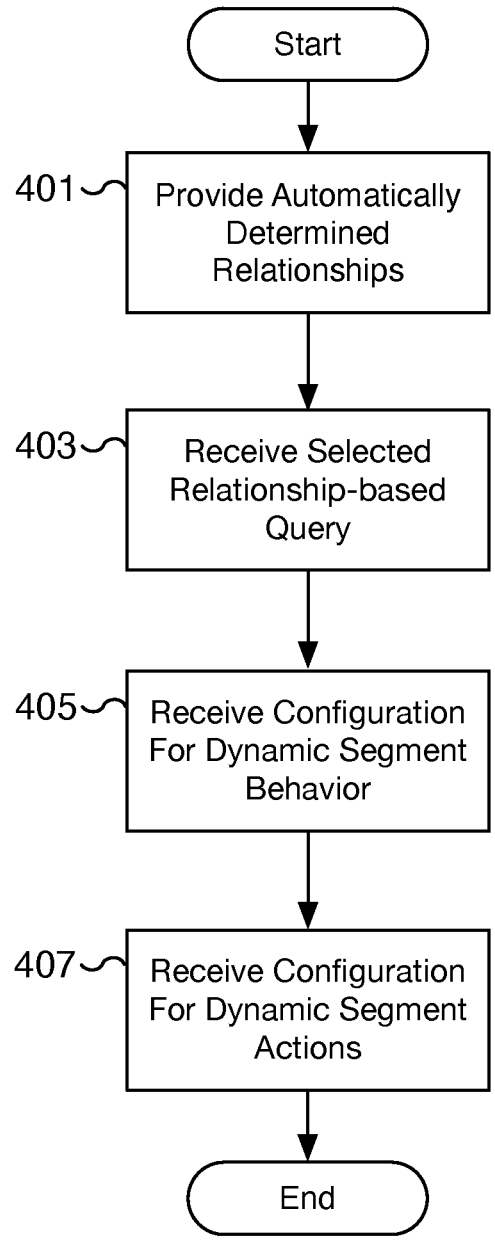
FIG. 4 is a flow chart illustrating an embodiment of a process for configuring a dynamic user interface item segment of an application user interface.

FIG. 4 is a flow chart illustrating an embodiment of a process for configuring a dynamic user interface item segment of an application user interface. Using the process of FIG. 4, a dynamic user interface item segment for viewing related item records of a selected item can be configured and embedded in the user interface view of the selected item record. The included related item records for display can be stored in and retrieved from a database across multiple related tables. In some embodiments, the process of FIG. 4 is performed at 205 of FIG. 2 and/or at 305 of FIG. 3. In some embodiments, the process of FIG. 4 is performed via clients such as clients 101, 103, 105, and 107 of FIG. 1 by accessing a cloud-based service hosted by a cloud service server such as cloud service server 111 of FIG. 1. In some embodiments, the data is stored in one or more databases such as database 113 of FIG. 1.

At 401, automatically determined relationships are provided. For example, using a user interface design tool, a user interface designer is provided with a list of automatically determined relationships for configuring a dynamic user interface item segment. In some embodiments, the automatically determined relationships can be populated in a selection dialog and used to create a selection query. In various embodiments, the determined relationships are based on properties and/or keys of a selected item record and can be updated as relationships with the item record change.

At 403, a selected relationship-based query is received. For example, a user interface designer selects a relationship-based query by selecting a relationship from the automatically determined relationships provided at 401. In some embodiments, the relationship is used to create a query that is used to determine the item records to include in the dynamic user interface item segment. In some embodiments, the query is a complex query that utilizes one or more of the relationship properties as the basis for the query. For example, the provided query that is received is used to select item records related to the current selected item record by making available the values associated with the selected item record as part of the selected relationship-based query. In some embodiments, the received relationship-based query specifies the selection criteria used to determine what item records to include in the dynamic user interface item segment.

At 405, a configuration for the behavior of the dynamic segment is received. For example, a configuration defining the behavior of the dynamic user interface item segment is specified by default and/or by a user interface designer. In some embodiments, the user interface behavior can include how to display the selected dynamic item records and how a user interacts with the displayed records. For example, in some embodiments, item records are displayed as user interface elements or user interface cards that can be arranged horizontally or vertically. A user can interact with the displayed cards using one or more touch gestures to reveal or hide different user interface cards associated with different item records. For example, item records displayed horizontally can be configured to respond to horizontal left and right swipes to reveal previous or next item records in the list of dynamic item records. Similarly, in some embodiments, the item records are displayed vertically and the dynamic item segment responds to vertical up and down user interactions. In various embodiments, the received configuration can also specify which fields of the item record to display and how to display the selected information, such as by specifying the position (or relative position) and formatting properties to apply for displaying an item record.

At 407, a configuration for actions of the dynamic segment is received. For example, actions to perform in response to the selection of different actionable portions of the dynamic user interface item segment are received. In some embodiments, a dynamic user interface item segment can include one or more user interface elements such as labels or buttons that can respond to user interaction by executing configured actions. For example, a See All label can be configured to display a user interface view with all items of the dynamic item segment in a scrollable view without the header section of the selected source item record. As another example, the selection of an item record from the dynamic item segment can be configured to display a detailed view of the selected item record. In some embodiments, an action can be configured to allow the user to create a new item record that belongs to the dynamic item segment. For example, a new item record can be created with the proper context such that the new item record meets the selection criteria of the dynamic item segment with respect to the current selected item record.

Figure 5:
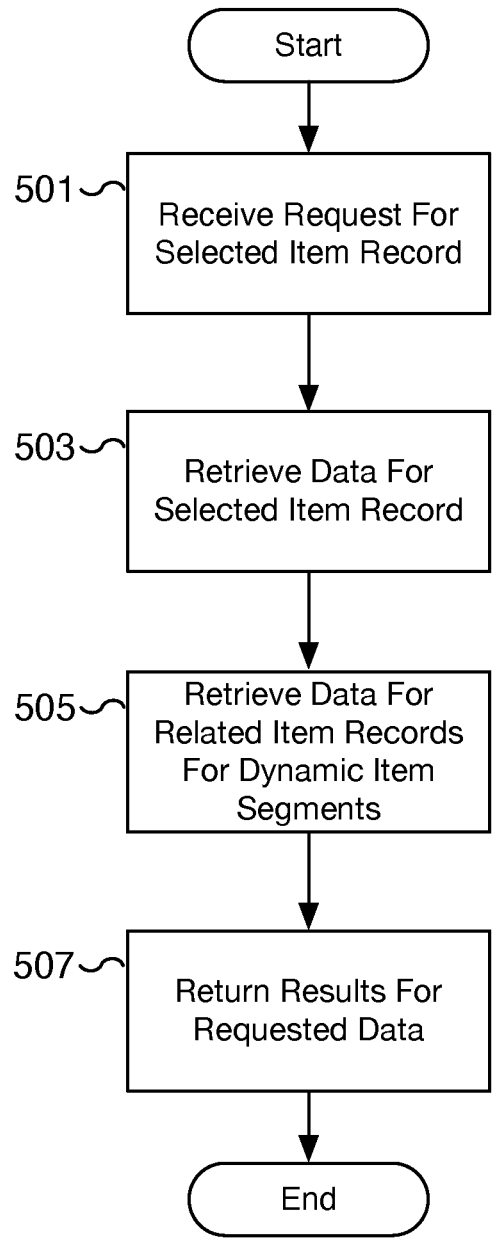
FIG. 5 is a flow chart illustrating an embodiment of a process for responding to a user interface with an embedded dynamic user interface item segment.

FIG. 5 is a flow chart illustrating an embodiment of a process for responding to a user interface with an embedded dynamic user interface item segment. For example, using the process of FIG. 5, a cloud service server returns the requested data of item records necessary to render a user interface screen of an application that includes a section dedicated to a selected item record and an embedded dynamic item segment section for related item records. In some embodiments, the process of FIG. 5 is performed in response to application events such as a user selecting to view a selected item record from a database such as a configuration management database (CMDB). In various embodiments, the corresponding application and its user interface are created and distributed using the processes of FIGS. 2-4. In some embodiments, the process of FIG. 5 is performed at 209 of FIG. 2 by a cloud service server such as cloud service server 111 of FIG. 1 in response to and to support clients such as clients 101, 103, 105, and 107 of FIG. 1. In some embodiments, the data is stored in a database such as database 113 of FIG. 1.

At 501, a request for a selected item record is received. For example, an application enters or refreshes an application screen for viewing a selected item record. The selected item record may be a record selected by the user from a previous user interface screen showing larger collection of records. As another example, the selected item record may be a record selected by the user from a previous user interface screen for a related item record. As part of rendering the current user interface screen, the application makes a request for the selected item record that is received. In various embodiments, the request is received by a cloud service server. For example, for an incident tracking application, a request to retrieve information of an item record associated with an information technology incident or ticket is received.

At 503, data for the selected item record is retrieved. For example, the item record including one or more fields of the item record is retrieved from a data store such as a customer database. In some embodiments, the database is a configuration management database (CMDB) for managing and tracking customer data such as customer assets. In some embodiments, the user must first authenticate and provide valid permissions before the data for the selected item record is retrieved.

At 505, data of related item records for dynamic item segments is retrieved. For example, for each embedded dynamic item segment of the user interface screen, a set of related item records is retrieved. In some embodiments, the item records are retrieved by performing the selection criteria query configured during the setup of the dynamic item segment. In various embodiments, the item records of each dynamic item segment are related to the selected item record of steps 501 and 503. For example, the performed query can utilize specific values associated with the selected item record of steps 501 and 503 to determine the set of item records to retrieve. As one example, a dynamic item segment can display related information technology incidents that are nearby to a selected incident that can be referenced at steps 501 and 503. The configured query includes the location of the selected incident for identifying item records that meet the location selection criteria. Using the specialized query, data for the matching item records is retrieved.

At 507, results for the requested data are returned. For example, the data retrieved at 503 and/or 505 is returned to the requesting client for rendering a user interface screen including an embedded dynamic item segment section. In some embodiments, the data is packaged together and returned as a single response or multiple responses and can be cached, for example, at either the cloud service server or at the appropriate client. For example, multiple item records for a dynamic item segment can be cached and only a subset of item records are displayed in the user interface at any given moment.

Figure 6:
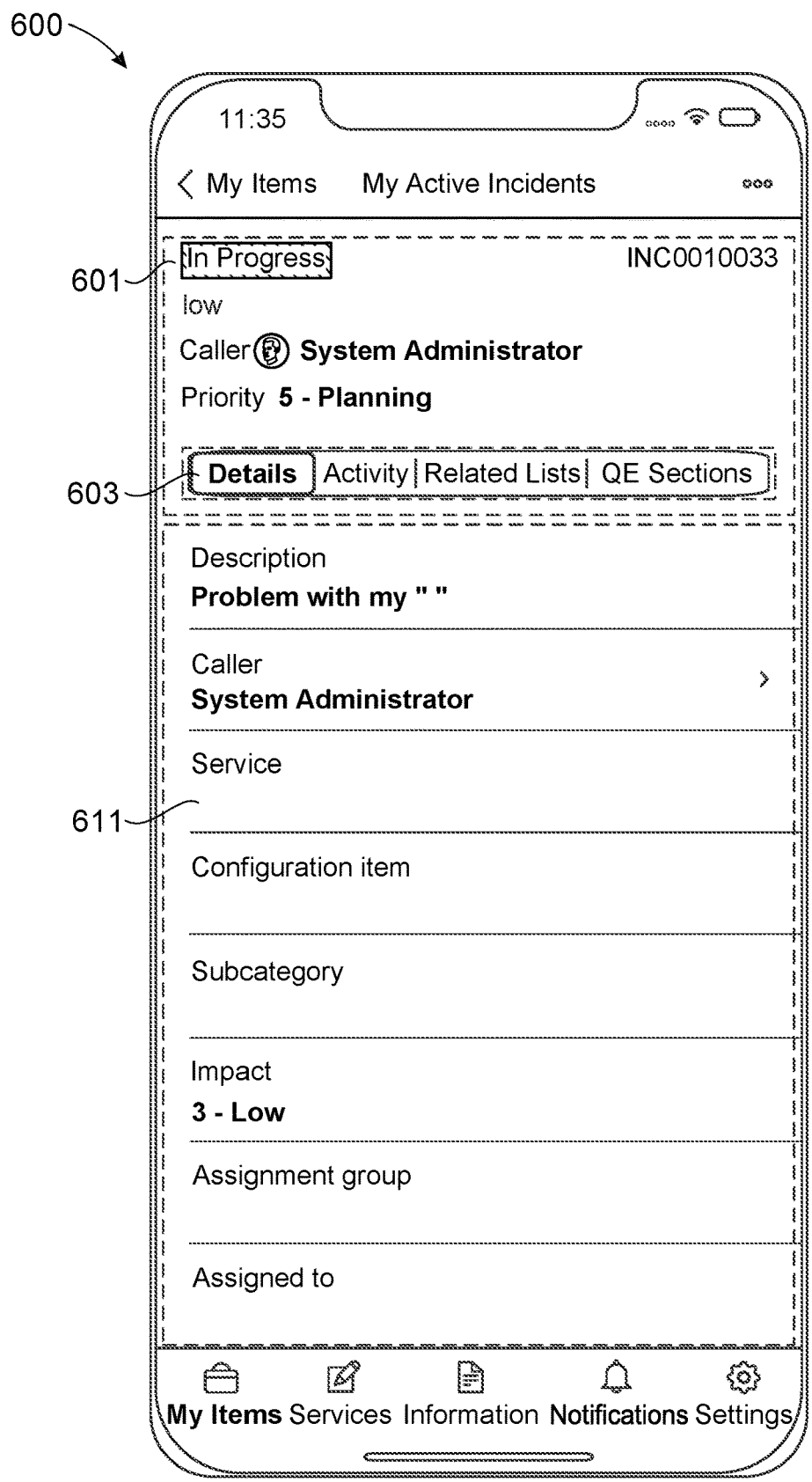
FIG. 6 is a diagram illustrating an embodiment of a user interface for displaying a selected item record.

FIG. 6 is a diagram illustrating an embodiment of a user interface for displaying a selected item record. In the example shown, user interface 600 includes header section element 601 and details segment element 611. Header section element 601 displays information related to a selected item record and further includes segment selection element 603 that is used to select one or more embedded segments for display. In the example shown, the details segment is shown as selected by segment selection element 603, which corresponds to displaying details segment element 611. In various embodiments, user interface 600 is configured and populated at least in part by using the processes of FIGS. 2-5 and displayed on an application running on a client such as one of clients 101, 103, 105, and 107 of FIG. 1 using data retrieved by a cloud service server such as cloud service server 111 of FIG. 1 from a database such as database 113 of FIG. 1.

In the example shown, user interface 600 corresponds to a screen of an end-user mobile application for tracking incidents such as information technology incidents. Using user interface 600, a user can display information related to a specific selected incident. For example, header section element 601 displays high-level information of the selected incident while details segment element 611 displays additional detailed information of the selected incident. In the example shown, header section element 601 displays the incident with incident identifier INC0010033, status "In Progress," impact score "low," caller "System Administrator" along with an icon of the associated caller, and priority "5— Planning." In various embodiments, the information displayed in header section element 601 is stored as part of the selected item record.

As shown in the example, segment selection element 603 included within header section element 601 is configured with four options: Details, Activity, Related Lists, and QE Sections. Depending on which segment is selected, a different segment can be displayed in the bottom portion of user interface 600. In the example shown, the details segment is selected and corresponding details segment element 611 is displayed and provides additional information of the selected item record. In some embodiments, the displayed information of details segment element 611 is also stored as part of the selected item record, for example, as additional fields of a database record. Details segment element 611 includes some fields with completed information and some fields that are incomplete. For example, the description field includes only the partial description "Problem with my " " ". As the item record is updated, the detailed information will reflect the updated status of the record.

In various embodiments, the display and behavior properties of the user interface elements of user interface 600 are configurable and include properties such as the font type, relative font size, font colors, background colors, stickiness of the user interface element, etc. For example, in some embodiments, the font size, colors, alignment, and positioning of the labels for header section element 601 and details segment element 611 can be configured using a cloud-based user interface designer tool.

Figure 7:
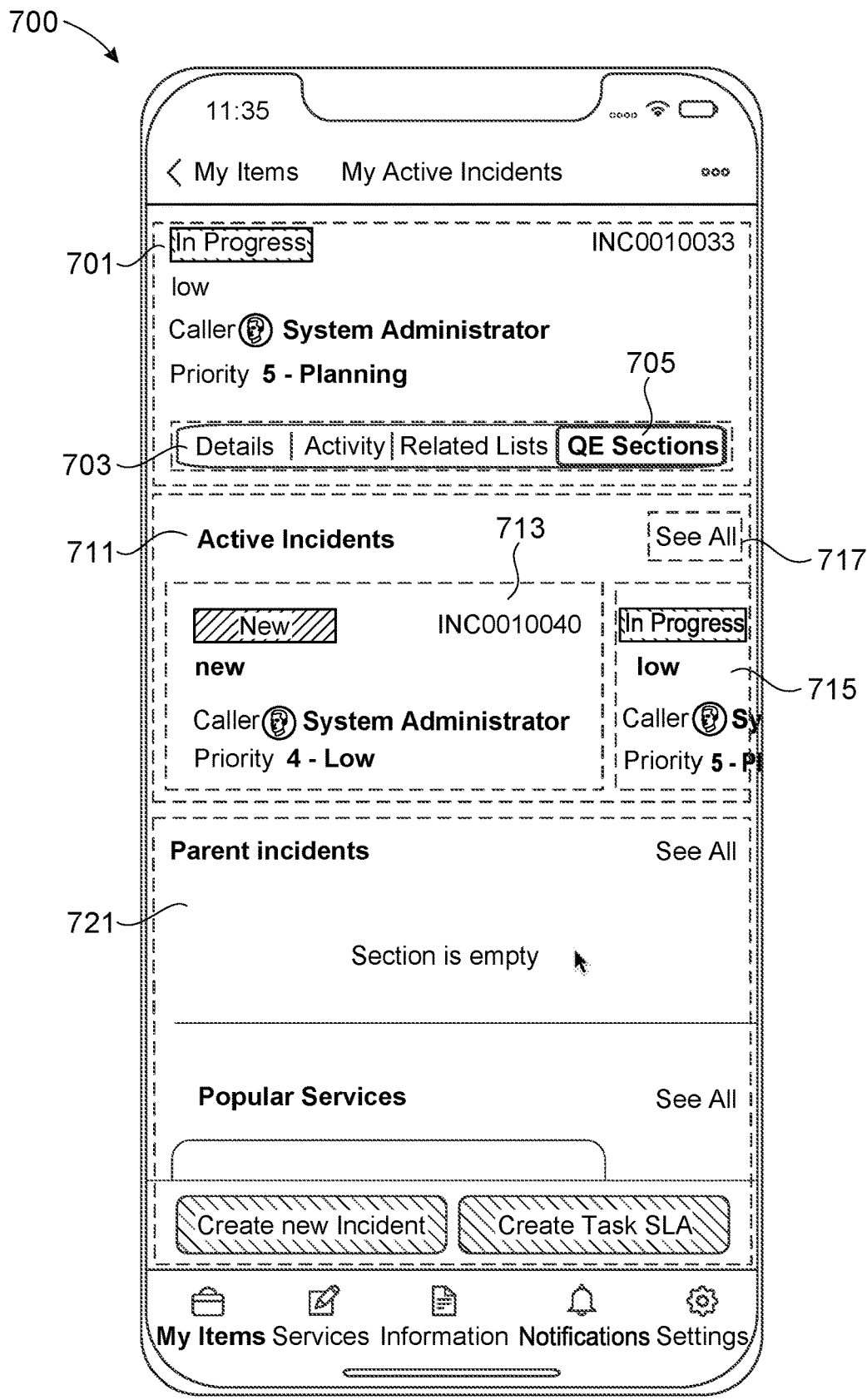
FIG. 7 is a diagram illustrating an embodiment of a user interface for displaying a selected item record along with dynamic user interface item segments for displaying related item records.

FIG. 7 is a diagram illustrating an embodiment of a user interface for displaying a selected item record along with dynamic user interface item segments for displaying related item records. In the example shown, user interface 700 includes header section element 701, active incidents segment element 711, and parent incidents segment element 721. Header section element 701 displays information related to a selected item record and further includes segment selection element 703 that is used to select one or more embedded segments for display. In the example shown, QE Sections option 705 is shown as selected for segment selection element 703, which corresponds to displaying active incidents segment element 711 and parent incidents segment element 721. In various embodiments, user interface 700 corresponds to user interface 600 of FIG. 6 but with QE sections option 705 selected for segment selection element 703 instead of the Details option. The inclusion of active incidents segment element 711 and parent incidents segment element 721 reflects the selection of QE sections option 705. In some embodiments, user interface 700 is configured and populated at least in part by using the processes of FIGS. 2-5 and displayed on an application running on a client such as one of clients 101, 103, 105, and 107 of FIG. 1 using data retrieved by a cloud service server such as cloud service server 111 of FIG. 1 from a database such as database 113 of FIG. 1.

In the example shown, active incidents segment element 711 is an embedded user interface element of user interface 700 that utilizes a dynamic item segment and includes item record cards 713 and 715 as well as "See All" element 717. In various embodiments, the item records displayed in active incidents segment element 711 are updated dynamically and are configured for inclusion with a selection criteria query based on the selected item record shown in header section element 701 (e.g., the item record with incident identifier INC0010033). Although only two item records corresponding to item record cards 713 and 715 are shown, a user can scroll horizontally to display additional item records that match the selection criteria. In the example shown, the item records are displayed horizontally as user interface cards. In various embodiments, the user interface can also be configured with an orientation (for example, to display the cards horizontally or vertically), with an optional title, and/or with a max number of cards to display at once.

In various embodiments, a user can navigate between different item records of an embedded dynamic item segment such as active incidents segment element 711 by using left and right swipe gestures and/or other alternative user actions such as horizontal scrolling user events. In some embodiments, the item records are selectable and upon selection, the selected item record such as the item record corresponding to item record card 713 is displayed. For example, a selected item record from active incidents segment element 711 can replace the selected item record shown in header section element 701. Once a new item record is selected, the contents of active incidents segment element 711 (as well as other sections of user interface 700) are updated. For example, the item records of active incidents segment element 711 are updated to include active incidents related to the newly selected item record.

In the example shown, the item records of active incidents segment element 711 are item records related to the item record of header section element 701. For example, the included item records of active incidents segment element 711 must each match a configured selection criteria that requires an item record share a specified relationship with the selected item record of header section element 701. For example, for a selected item record of header section element 701 with an active "In Progress" status, the included item records in the embedded dynamic item segment of active incidents segment element 711 are all active incidents and each has a status property that is either "New" or "In Progress." As another example, a selected incident with a "Closed" or "Resolved" status can be displayed along with an embedded dynamic item segment for Inactive incidents instead of Active incidents.

In the example shown, item record cards 713 and 715 display high-level information of their corresponding item records similar to the displayed information of the item record associated with header section element 701. Item record cards 713 and 715 include item record information such as an incident identifier (e.g., INC0010040 for item record card 713), status (e.g., "New" for item record card 713 and "In Progress" for item record card 715), impact score (e.g., "new" for item record card 713 and "low" for item record card 715), caller (e.g., "System Administrator" for item record card 713), and priority (e.g., "4— Low" for item record card 713). Portions of the information for item record card 715 are hidden offscreen and can be revealed by the user manipulating the displayed item record cards of active incidents segment element 711.

In some embodiments, "See All" element 717 of active incidents segment element 711 is a user interface label configured with an action to display a new user interface screen. The new user interface screen allows the user to scroll through all item records of the dynamic item segment that meet the selection criteria of active incidents segment element 711. For example, a user can select "See All" element 717 to reveal a new user interface view that shows only the related item records of the dynamic item segment without displaying the selected item record of header section element 701. The revealed user interface view allows the user to navigate and view the different item records using a different user interface than the embedded dynamic item segment interface of active incidents segment element 711.

In the example shown, parent incidents segment element 721 is included as part of user interface 700 and demonstrates that a selected option of segment selection element 703 can correspond to displaying multiple embedded sections. Moreover, a displayed section can further include one or more sub-sections as well as interactive buttons. For example, parent incidents segment element 721 is shown to include a sub-section labeled Popular Services as well as interactive buttons for creating a new incident and a new task service level agreement (SLA). In the example shown, the selected item record has no parent incidents.

Figure 8:
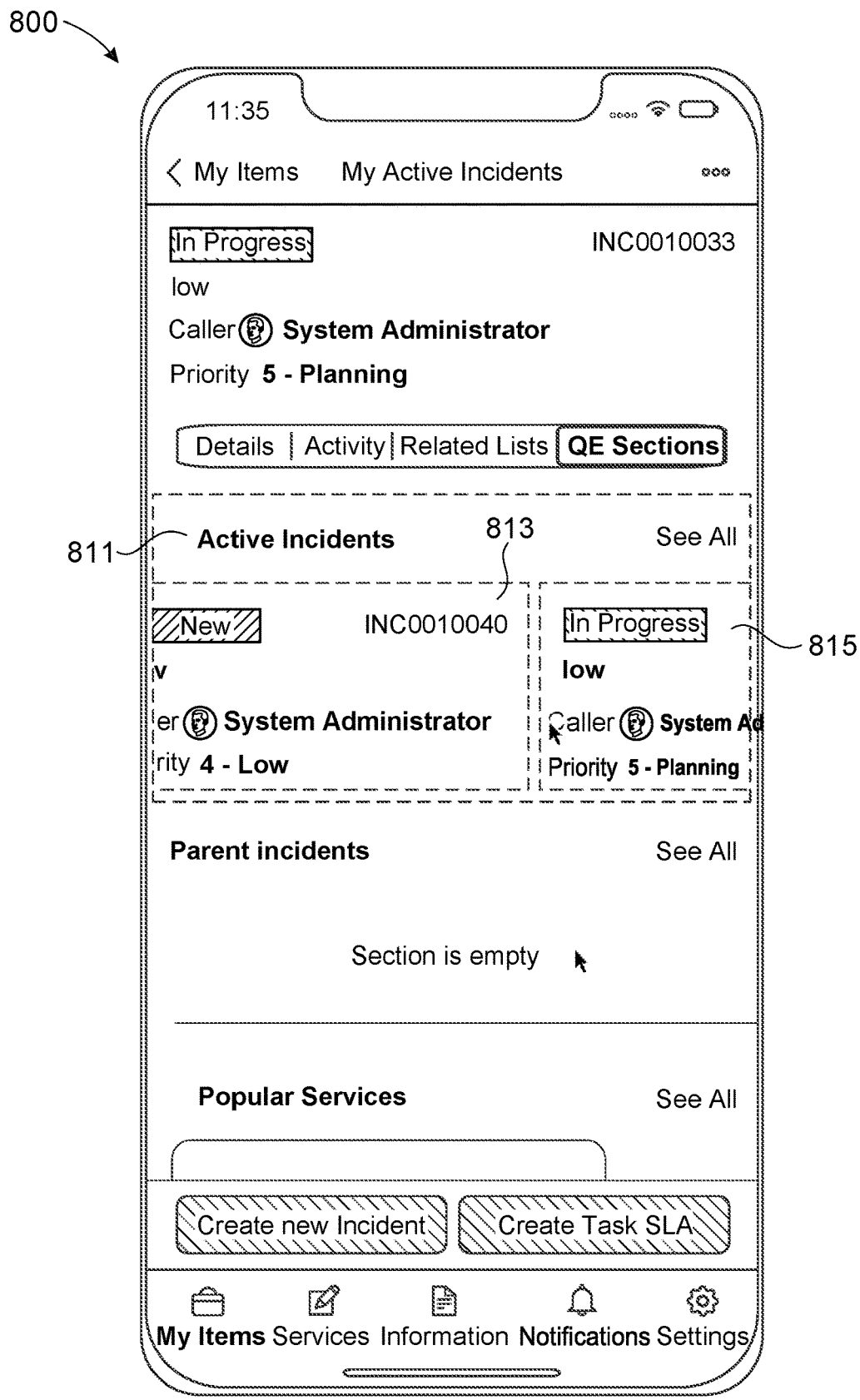
FIG. 8 is a diagram illustrating an embodiment of a user interface for displaying a selected item record along with dynamic user interface item segments for displaying related item records.

FIG. 8 is a diagram illustrating an embodiment of a user interface for displaying a selected item record along with dynamic user interface item segments for displaying related item records. In the example shown, user interface 800 includes active incidents segment element 811 that is an embedded dynamic item segment. User interface 800 corresponds to user interface 700 of FIG. 7 and specifically active incidents segment element 811 corresponds to active incidents segment element 711 of FIG. 7 after the user has begun to navigate through the displayed item records of active incidents segment element 811. In the example shown, active incidents segment element 811 includes item record cards 813 and 815 that correspond to item record cards 713 and 715 of FIG. 7. As shown in the example, the user has begun to reveal additional information of item record card 815. As more of item record card 815 is revealed, portions of item record card 813 are now hidden. As demonstrated by the change in the item record cards between user interface 700 of FIG. 7 and user interface 800, a user can navigate through the matching item records by scrolling horizontally in either direction. Although the item record cards are shown arranged horizontally in active incidents segment element 811, in some embodiments, the item record cards are arranged vertically (not shown) and a user scrolls through the item record cards using up/down actions and/or other appropriate user interface swipe gestures.

Figure 9:
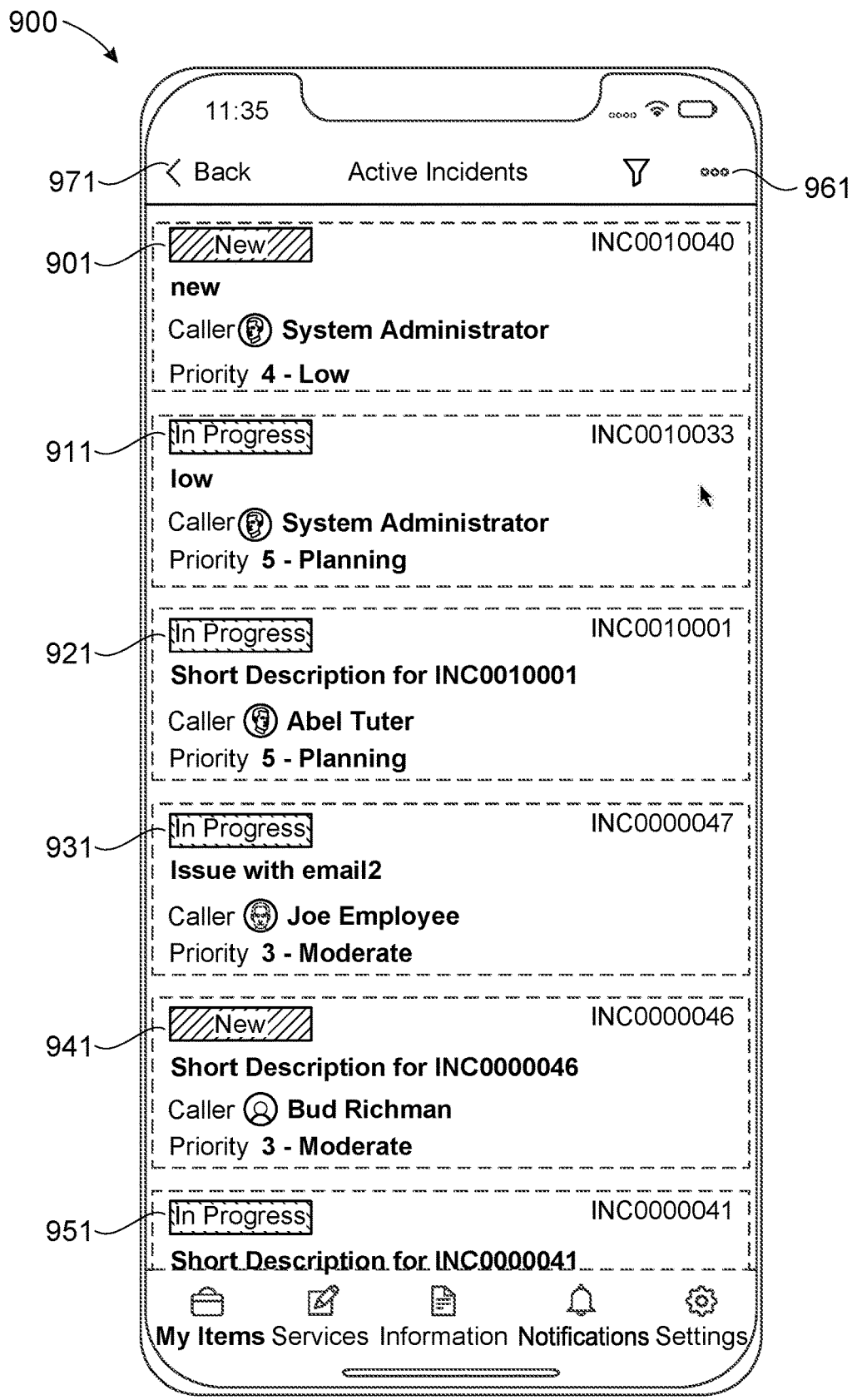
FIG. 9 is a diagram illustrating an embodiment of a user interface for displaying item records of a dynamic user interface item segment.

FIG. 9 is a diagram illustrating an embodiment of a user interface for displaying item records of a dynamic user interface item segment. In the example shown, user interface 900 includes item record cards 901, 911, 921, 931, 941, and 951, expandable menu element 961 (shown as three dots), and back button 971. Each of item record cards 901, 911, 921, 931, 941, and 951 displays high-level information of the corresponding item record. The item records included for display in user interface 900 are the item records that match a selection criteria of a dynamic user interface item segment from a previous user interface screen. In the example of FIG. 9, the previous user interface screen of user interface 900 is user interface 700 of FIG. 7. User interface 900 is displayed in response to the user activating the action associated with "See All" element 717 of FIG. 7. In the example shown, item record cards 901 and 911 correspond to item records 713 and 715 of FIG. 7, respectively, which are also the first two item records of active incidents segment element 711 of FIG. 7.

In various embodiments, user interface 900 is similar to active incidents segment element 711 of FIG. 7 in that user interface 900 allows the user to view and navigate through the included item records of active incidents segment element 711 of FIG. 7 as determined by the selection criteria context of the selected item record of header section element 701 of FIG. 7. However, while user interface 900 maintains the selection criteria context of the selected item record of header section element 701 of FIG. 7, unlike active incidents segment element 711 of FIG. 7, user interface 900 displays the item records vertically (e.g., as a list view) and can include additional (or different) information for each displayed item record than the information displayed by active incidents segment element 711 of FIG. 7. In order to return to the previous context of user interface 700, the user can select back button 971.

In some embodiments, expandable menu element 961 includes invocable actions that are applied with respect to the context of user interface 900 in relation to its previous user interface screen, such as user interface 700 of FIG. 7. For example, one or more actions of expandable menu element 961 are applied within the context of the selected item record of header section element 701 of FIG. 7 and/or the selection criteria of active incidents segment element 711 of FIG. 7. In some embodiments, an action of expandable menu element 961 allows the user to create a new item record that is included in the associated dynamic item segment of user interface 900 such as active incidents segment element 711 of FIG. 7. For example, a new item record can be created with the proper context such that the new item record meets the selection criteria of the dynamic item segment with respect to a current selected item record.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
receiving an indication to view a selected incident record; and
providing a user interface view for the selected incident record, wherein the user interface view includes at least one embedded segment section including scrollable items representing other related incident records different from the selected incident record but matching a location, an assignment group, a description, a status, or a priority of the selected incident record, wherein the user interface view for the selected incident record was configured to provide the at least one embedded segment section due to a configuration including a selection among automatically determined options of related record groups associated with the selected incident record.

2. The method of claim 1, further comprising:
receiving a user interface configuration for the user interface view for the selected incident record, wherein the received user interface configuration includes a selection criteria specification for identifying the other related incident records associated with the selected incident record.

3. The method of claim 2, wherein the selection criteria specification for identifying the other related incident records associated with the selected incident record includes a database query.

4. The method of claim 3, wherein the database query includes a reference to at least one field of the selected incident record.

5. The method of claim 4, wherein the at least one field of the selected incident record is associated with a database table key.

6. The method of claim 1, wherein the at least one embedded segment section is configured to display information from each of the other related incident records associated with the selected incident record using user interface card elements.

7. The method of claim 6, wherein a plurality of the user interface card elements are arranged horizontally in the at least one embedded segment section, and at least one of the plurality of the user interface card elements is configured to respond to a horizontal scrolling user event.

8. The method of claim 7, wherein the horizontal scrolling user event is associated with revealing a portion of at least one of the user interface card elements that was previously hidden.

9. The method of claim 6, wherein a plurality of the user interface card elements are arranged vertically in the at least one embedded segment section, and at least one of the plurality of the user interface card elements is configured to respond to a vertical scrolling user event.

10. The method of claim 9, wherein the vertical scrolling user event is associated with revealing a portion of at least one of the user interface card elements that was previously hidden.

11. A system, comprising:
one or more processors; and
a memory coupled to the one or more processors, wherein the memory is configured to provide the one or more processors with instructions which when executed cause the one or more processors to:
receive an indication to view a selected incident record; and
provide a user interface view for the selected incident record, wherein the user interface view includes at least one embedded segment section including scrollable items representing other related incident records different from the selected incident record but matching a location, an assignment group, a description, a status, or a priority of the selected incident record, wherein the user interface view for the selected incident record was configured to provide the at least one embedded segment section due to a configuration including a selection among automatically determined options of related record groups associated with the selected incident record.

12. The system of claim 11, wherein the memory is further configured to provide the one or more processors with instructions which when executed cause the one or more processors to:
receive a user interface configuration for the user interface view for the selected incident record, wherein the received user interface configuration includes a selection criteria specification for identifying the other related incident records associated with the selected incident record.

13. The system of claim 12, wherein the selection criteria specification for identifying the other related incident records associated with the selected incident record includes a database query.

14. The system of claim 13, wherein the database query includes a reference to at least one field of the selected incident record.

15. The system of claim 14, wherein the at least one field of the selected incident record is associated with a database table key.

16. The system of claim 11, wherein the at least one embedded segment section is configured to display information from each of the other related incident records associated with the selected incident record using user interface card elements.

17. The system of claim 16, wherein a plurality of the user interface card elements are arranged horizontally in the at least one embedded segment section, and at least one of the plurality of the user interface card elements is configured to respond to a horizontal scrolling user event.

18. The system of claim 17, wherein the horizontal scrolling user event is associated with revealing a portion of at least one of the user interface card elements that was previously hidden.

19. The system of claim 16, wherein a plurality of the user interface card elements are arranged vertically in the at least one embedded segment section, and at least one of the plurality of the user interface card elements is configured to respond to a vertical scrolling user event.

20. A computer program product, the computer program product being embodied in a non-transitory computer readable storage medium and comprising computer instructions for:
receiving an indication to view a selected incident record; and
providing a user interface view for the selected incident record, wherein the user interface view includes at least one embedded segment section including scrollable items representing other related incident records different from the selected incident record but matching a location, an assignment group, a description, a status, or a priority of the selected incident record, wherein the user interface view for the selected incident record was configured to provide the at least one embedded segment section due to a configuration including a selection among automatically determined options of related record groups associated with the selected incident record.

\* \* \* \* \*